(12) United States Patent
Wei et al.

(10) Patent No.: US 7,475,263 B2
(45) Date of Patent: Jan. 6, 2009

(54) METHOD FOR POWER MANAGEMENT OF CENTRAL PROCESSOR UNIT

(75) Inventors: Jui-Ming Wei, Hsin-Tien (TW);
Cheng-Wei Huang, Hsin-Tien (TW);
Yao-Chun Su, Hsin-Tien (TW);
Ruei-Ling Lin, Hsin-Tien (TW)

(73) Assignee: Via Technologies Inc., Taipei County (TW)

( * ) Notice: Subject to any disclaimer, the term of this patent is extended or adjusted under 35 U.S.C. 154(b) by 480 days.

(21) Appl. No.: 11/404,810

(22) Filed: Apr. 17, 2006

(65) Prior Publication Data

US 2007/0055899 A1  Mar. 8, 2007

(30) Foreign Application Priority Data

Sep. 6, 2005  (TW) .............................. 94130588 A

(51) Int. Cl.
*G06F 1/26* (2006.01)
(52) U.S. Cl. ...................... 713/300; 713/320; 713/323
(58) Field of Classification Search .................. 713/300, 713/323
See application file for complete search history.

(56) References Cited

U.S. PATENT DOCUMENTS

| 6,085,330 A | * | 7/2000 | Hewitt et al. ................. 713/322 |
| 2003/0163745 A1 | * | 8/2003 | Kardach ........................ 713/320 |
| 2006/0047986 A1 | * | 3/2006 | Kurts et al. .................. 713/320 |

* cited by examiner

*Primary Examiner*—Nitin C Patel
(74) *Attorney, Agent, or Firm*—Rosenberg, Klein & Lee

(57) ABSTRACT

A method for a power management of a central processor unit is disclosed. The method is applied to when the central processor unit is in a low power state without snooping and a bus master signal is sent from a peripheral device. First, a South Bridge sends a control signal to a central processor unit to drive the central processor unit to enter a low power state allowing snooping. Afterward an arbiter of the North Bridge is enabled. If the bus master signal is sent from the peripheral device to the South Bridge, an arbiter of the South Bridge is also enabled. And then the bus master signal is snooped by the central processor unit and the data is transmitted. After the bus master signal is snooped and the data has been transmitted, the arbiters are disabled and the South Bridge drives the central processor unit to return to the low power state without snooping.

20 Claims, 6 Drawing Sheets

METHOD FOR POWER MANAGEMENT OF CENTRAL PROCESSOR UNIT

FIELD OF THE INVENTION

The present invention relates to a method for a power management, and relates in particular to the method for the power management of a central processor unit that the central processor unit will enter a low power state allowing snooping from a low power state without snooping while a bus master signal is received.

BACKGROUND OF THE INVENTION

Currently, advanced power management (APM) and advanced configuration and power interface (ACPI) are the main power management systems in computer systems. In APM, the power management is controlled by Basic Input/Output System (BIOS) and APM is a power management system with low efficiency for early stage. However, in ACPI, the power management is controlled by Operating System (OS). There are four states of ACPI power management in a computer system and they are Global (G) state, Device (D) state, Sleeping (S) state and central processor unit (CPU, C) state.

Referring to FIG. 1, a schematic diagram illustrating a conventional CPU (C) operates under ACPI power management is showed. In FIG. 1, a CPU can work under four power states: C0 state, C1 state, C2 state and C3 state. While in the C0 state, the CPU works to execute instructions normally. While in the C1 state, The CPU is in halt mode, but still maintains cache integrity. While in the C2 state, the power savings of the C1 state are improved and specifically for multiprocessor systems such that one CPU is in halt mode and the others continue operation. While in the C3 state, the power savings of the C1 and C2 state are improved and the CPU is effectively switched off. Under C1, C2 and C3 states, an OS allows the CPU to enter a proper low power state based on the status of the CPU in order to achieve power savings.

The C3 state offers improved power savings over the C1 and C2 states. Before the CPU enters the C3 state, a command is sent by the OS to disable arbiters of a South Bridge and a North Bridge. Moreover, the events for processing aren't transmitted from the South Bridge or the North Bridge to the CPU in the C3 state until the CPU returns to the C0 state. After the arbiters of the South Bridge and the North Bridge are both disabled, the CPU enters the C3 state immediately. While in the C3 state, the CPU's caches maintain state but the CPU is not required to snoop bus master or CPU accesses to memory.

As can be seen from FIG. 1, the CPU begins work in the C0 state, which is a normal operation state, and then enters the C1, C2 or C3 state, which means the power savings state. If an interrupt request signal or a bus master signal is issued for dealing with, the CPU will return to the C0 state whether it is in the C1, C2 or C3 state. However, the power savings performance of the recovery mechanism is not good enough, in particular that it is extremely worse when the CPU is originally in the C3 state. While the arbiters of the North Bridge and the South Bridge are enabled only for transmitting data between those peripheral devices of the North Bridge or the South Bridge and a memory in a computer system, a bus master signal is issued from the peripheral devices and the CPU immediately returns to the C0 state from the C3 state. And then, the bus master signal can be transmitted to the CPU via the arbiters for snooping in order to transmit data between the peripheral devices and the memory in the computer system. However, under the above conditions, snooping the bus master signal, the CPU keeps staying in the C2 state without returning to the C0 state with extra power consumption.

Therefore, a method for a power management of a CPU is provided to overcome the above problems. If the North Bridge or the South Bridge receives a bus master signal, the CPU is allowable to enter a low power state allowing snooping from a low power state without snooping and the bus master signal can be snooped.

SUMMARY OF THE INVENTION

Briefly speaking, the object of the present invention is to provide a method for a power management of a CPU. The method is that the CPU is allowable to enter a low power state allowing snooping from a low power state without snooping and a bus master signal is then snooped to achieve power savings if the bus master signal is sent by peripheral devices of a computer system.

The invention provides a method for the power management of the CPU that the CPU is able to enter the C2 state allowing snooping from the C3 state without snooping and the bus master signal will be sent to the CPU for snooping if the North Bridge or the South Bridge receives the bus master signal sent by a peripheral device. First of all, a control signal is transmitted from the South Bridge to the CPU to drive the CPU to enter the C2 state. While the CPU enters the C2 state, a confirming signal is transmitted from the South Bridge to the North Bridge to make sure that the CPU has entered the C2 state. And then, the North Bridge enables its arbiter according to the confirming signal in order to transmit the bus master signal to the CPU for snooping in order to transmit the data. Also, the South Bridge enables its arbiter when the South Bridge receives bus master signal. Lastly, the arbiters are disabled and the CPU is driven to return to the C3 state to achieve power savings after the bus master signal is snooped and the data has been transmitted.

BRIEF DESCRIPTION OF THE DRAWINGS

The accompanying drawings are incorporated into and form a part of the specification for the purpose of explaining the principles of the invention. The drawings are not to be constructed as limiting the invention to only the illustrated and describe examples of how the invention can be made and used. Further features and advantages will become apparent from the following and more particular description of the invention, as illustrated in the accompanying drawings, wherein.

DETAILED DESCRIPTION OF THE PREFERRED EMBODIMENTS

The illustrative embodiments of the present invention will be described with reference to the figure drawings wherein like elements and structures are indicated by like reference numbers.

Figure 1:
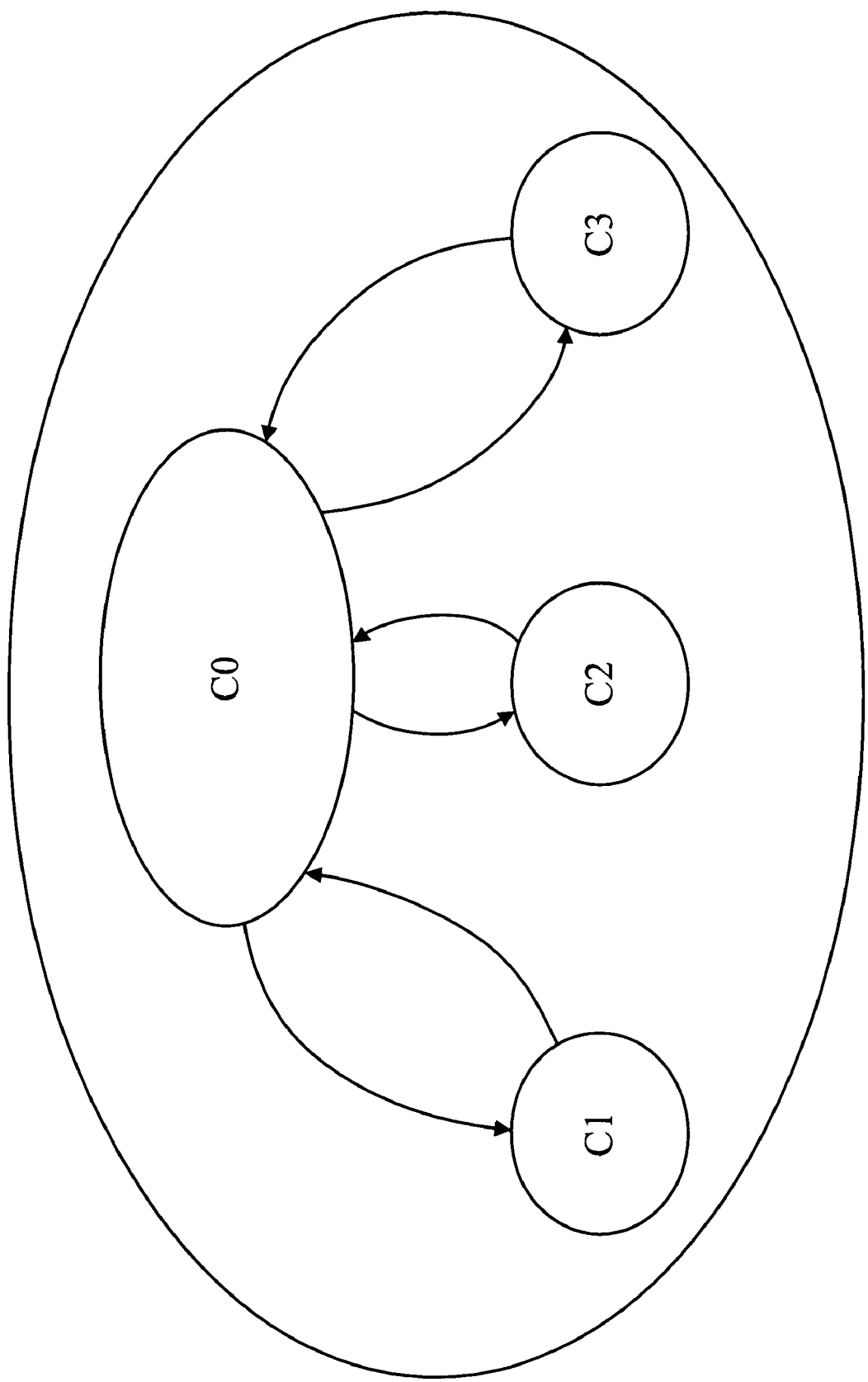
FIG. 1 is a schematic diagram (prior art) illustrating a conventional central processing unit of ACPI.
Figure 2:
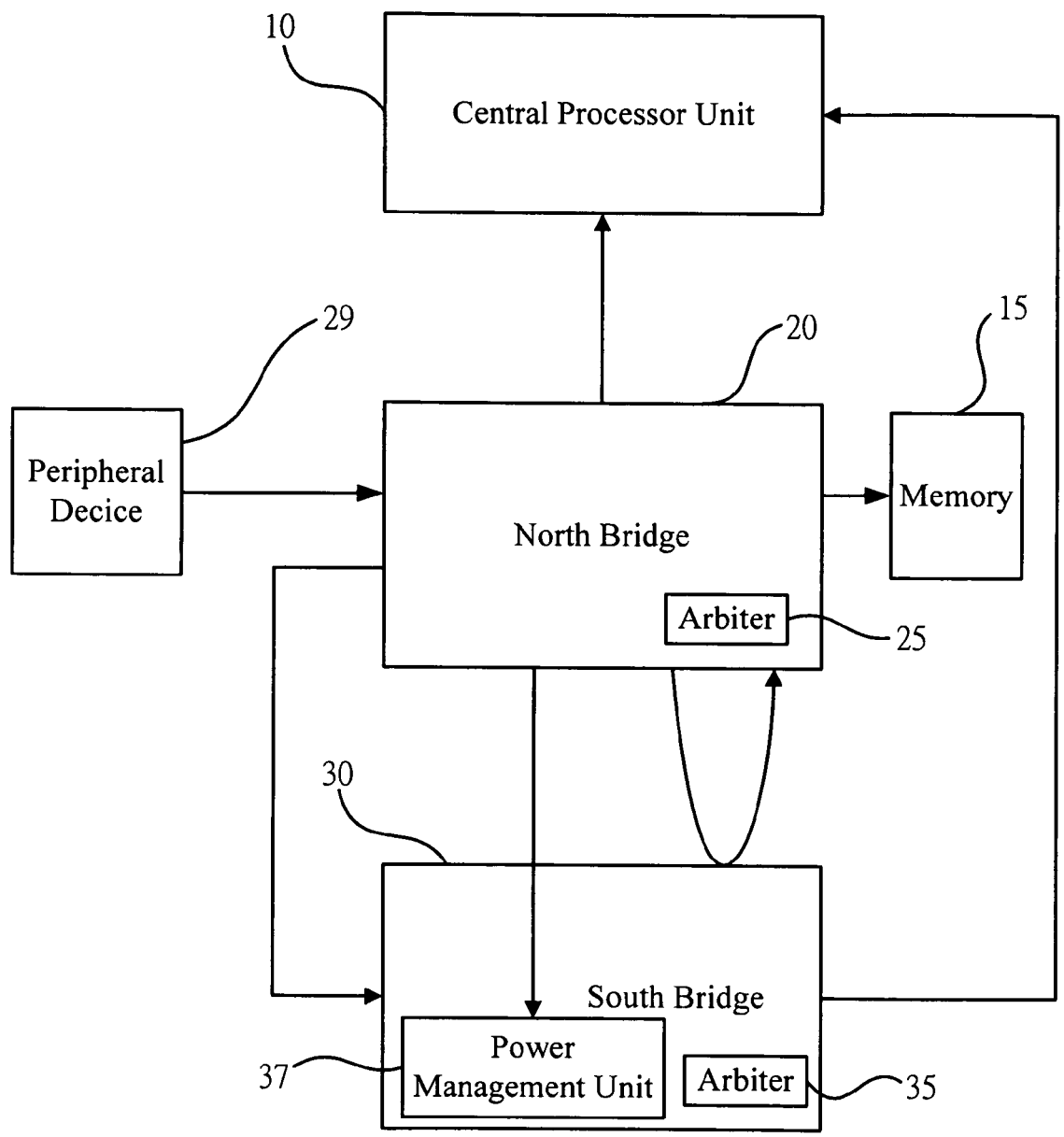
FIG. 2 is a block diagram according to an embodiment of the present invention.
Figure 3:
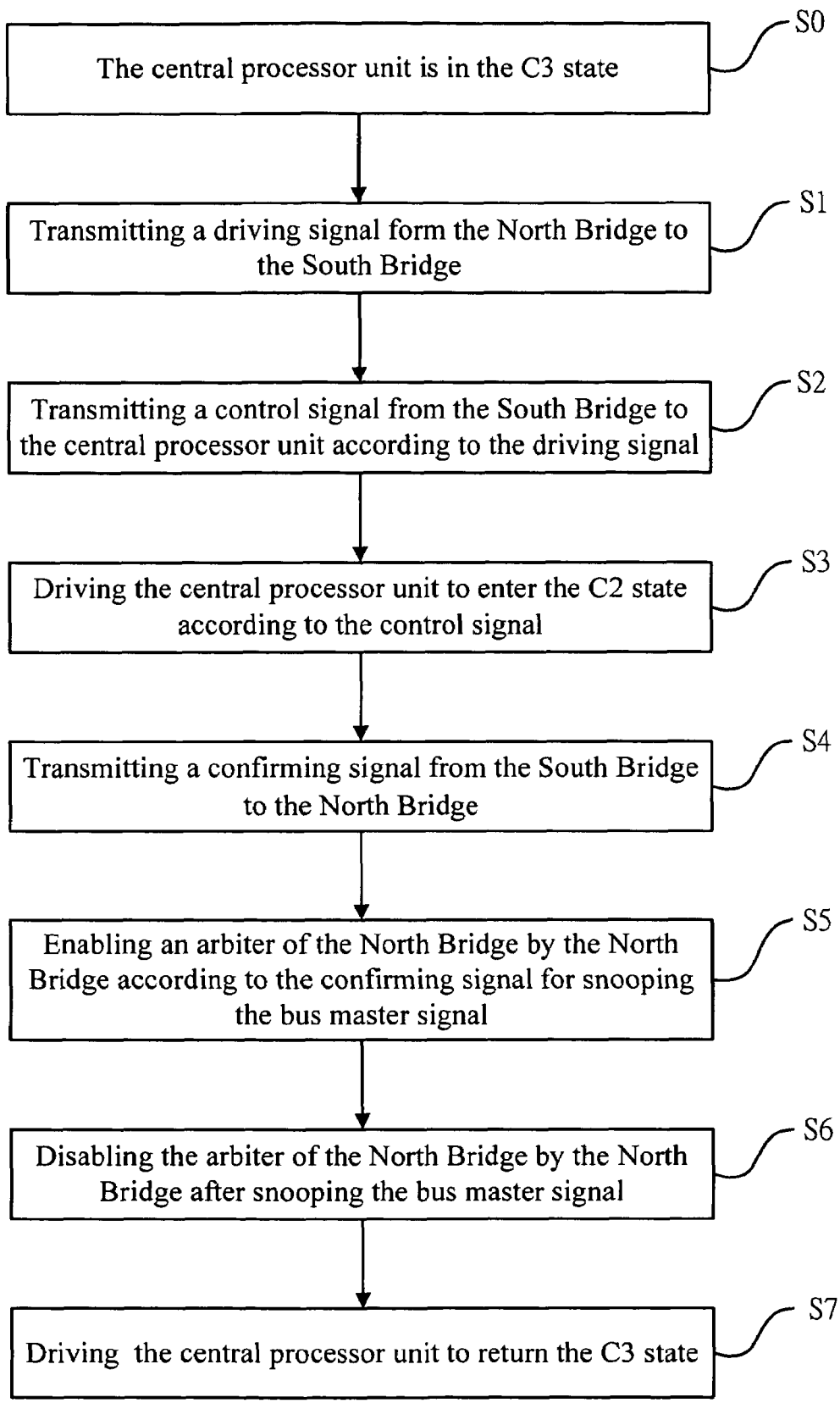
FIG. 3 is a flowchart according to an embodiment of the present invention.

Referring now to the drawings and particularly to FIG. 2 and FIG. 3, a block diagram and a flowchart according to an embodiment of the present invention are illustrated respectively. As shown in step S0, a CPU 10 is in a C3 state which is a low power state without snooping, and an arbiter 25 of a North Bridge 20 and an arbiter 35 of a South Bridge 30 are both disabled. When a bus master signal which is sent by a peripheral device 29 is received by the North Bridge 20, such as that the bus master signal is transmitted from an Accelerated Graphics Port (AGP) to the North Bridge 20, a driving signal is transmitted from the North Bridge 20 to the South Bridge 30 in step S1. Next, a control signal is sent from the South Bridge 30 to the CPU 10 according to the driving signal in step S2. Afterward the CPU 10 is able to enter a C2 state according to the control signal, wherein the C2 state is a low power state allowing snooping in step S3.

In the above steps, a trigger signal transmitted from the North Bridge 20 to a power management unit 37 of the South Bridge 30 serves as the driving signal for enforcing the South Bridge 30 to send the control signal to the CPU 10. The control signal is transmitted from the power management unit 37 of the South Bridge 30 to the CPU 10 to enable the CPU 10 to enter the C2 state. Sequentially, a confirming signal is transmitted from the South Bridge 30 to the North Bridge 20 in step S4 to enable the North Bridge 20 to make sure whether the CPU 10 has entered the C2 state. After the CPU 10 has entered the C2 state, the arbiter 25 of the North Bridge 20 is enabled according to the confirming signal so that the bus master signal received by the North Bridge 20 can be transmitted to the CPU 10 for snooping in order to transmit data between the peripheral device 29 and a memory 15 in step S5.

The arbiter 25 will be disabled by the North Bridge 20 in Step S6, after the bus master signal is snooped and the data has been transmitted between the peripheral device 29 and the memory 15, which means that there is no bus master signal received by the North Bridge 10. After the control signal is issued from the power management unit 37 of the South Bridge 30, the CPU 10 is forced to return to the C3 state in step S7. According to step S7, the OS cannot find out that the CPU 10 changes its state from the C3 state to the C2 state and from the C2 state to the C3 state.

In the above steps, the North Bridge 20 enables its arbiter 25 after the North Bridge 20 identifies that the CPU 10 has entered the C2 state according to the confirming signal transmitted from the South Bridge 30. If the North Bridge 20 is unable to make sure that the South Bridge 30 drives whether the CPU 10 enters the C2 state and the arbiter 25 is enabled so that the bus master signal can be transmitted to the CPU 10, there may have some problems as the CPU 10 still stays in the C3 state. So there must be a handshake for negotiation between the North Bridge 20 and the South Bridge 30 in step S1. Therefore, the confirming signal is transmitted from the South Bridge 30 to the North Bridge 20 by the handshake method as described in step S4 when the South Bridge 30 enforces the CPU 10 to enter the C2 state.

In addition, after the driving signal is transmitted from the North Bridge 20 to the South Bridge 30 in step S1, the North Bridge 20 keeps on issuing an indicating signal to the South Bridge 30 until the bus master signal is snooped by the CPU 10 and the data has been transmitted between the peripheral device 29 and the memory 15 in order to avoid the South Bridge 30 to drive the CPU 10 to return to the C3 state. While the procedure that the bus master signal transmitted from the North Bridge 20 to the CPU 10 and the data is transmitted between the peripheral device 29 and the memory 15 are not finished yet, the CPU 10 isn't allowed returning to the C3 state. Therefore, the South Bridge 30 can have information to know whether there is still the bus master signal not snooped by the CPU10 after the CPU 10 enters the C2 state and the South Bridge 30 can determine when to drive the CPU 10 to return back to the C3 state.

Also in step S1, the trigger signal sent by the North Bridge 20 serves as the driving signal for driving the South Bridge 30 and can be replaced by the indicating signal, which means that the indicating signal can be transmitted from the North Bridge 20 to the South Bridge 30 and can serve as the driving signal so that the South Bridge 30 has information to know whether there is the bus master signal received by the North Bridge 20 at the same time.

Figure 4:
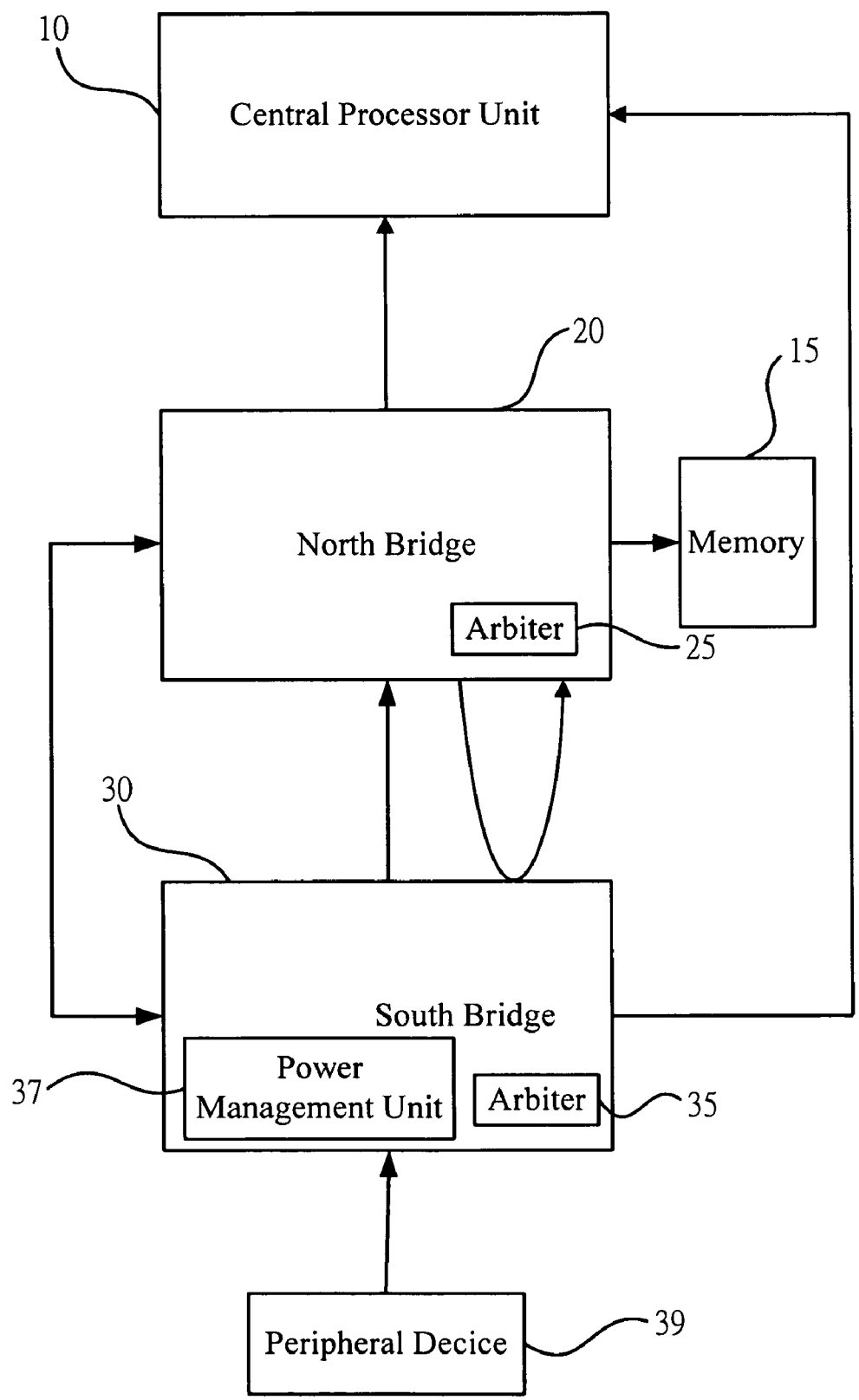
FIG. 4 is another block diagram according to another embodiment of the present invention.
Figure 5:
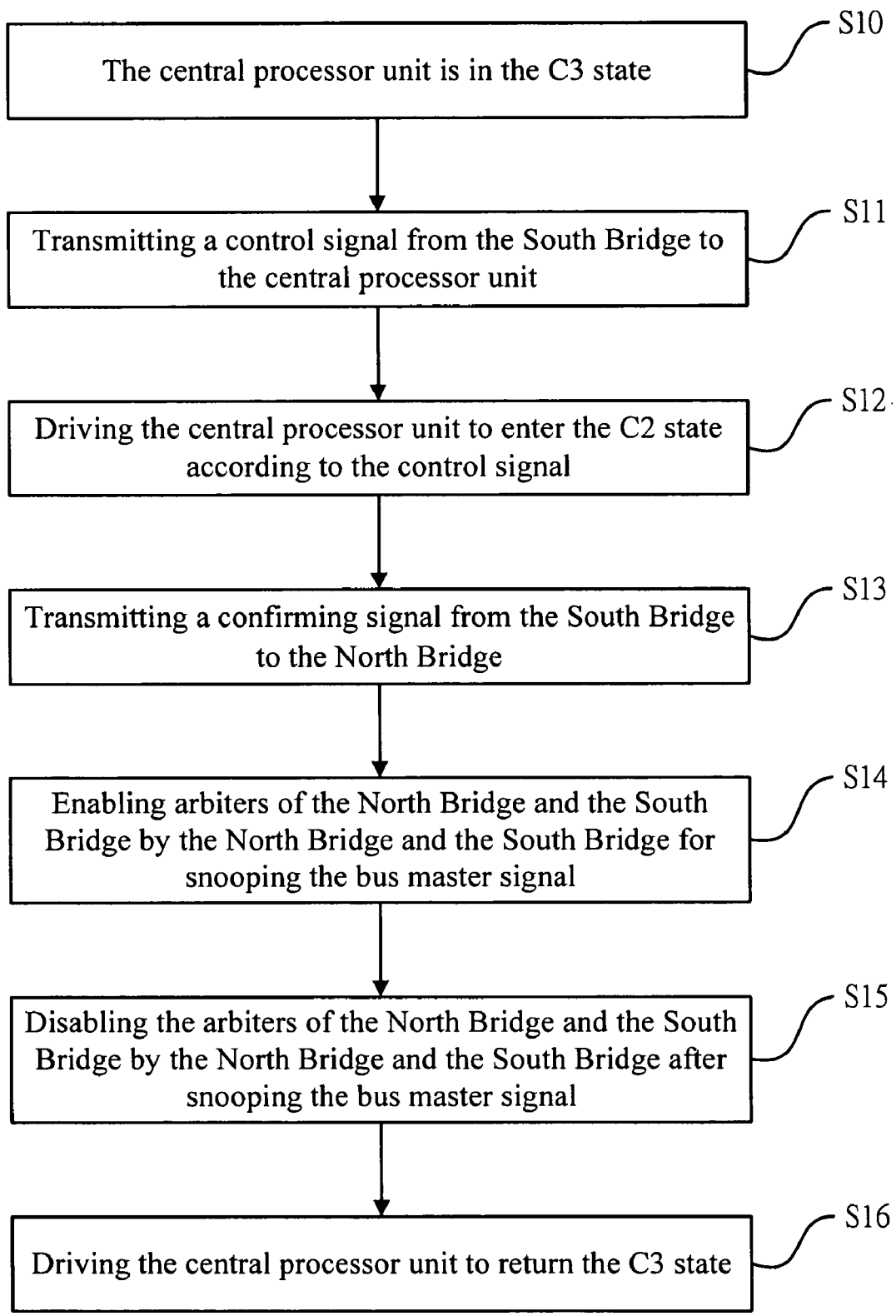
FIG. 5 is another flowchart according to another embodiment of the present invention.

Referring now to FIG. 4 and FIG. 5, a block diagram and a flowchart according to another embodiment of the present invention are illustrated respectively. There is a difference between the first embodiment and the second embodiment. As shown in FIG. 2 and FIG. 3, the bus master signal is issued from the peripheral device 29, which is coupled to the North Bridge 20 when the CPU 10 is in the C3 state, whereas the peripheral device 39 is coupled to the South Bridge 30 in the embodiment. As shown in step S10, the bus master signal is transmitted from the peripheral device 39 to the South Bridge 30 when the CPU 10 is in the C3 state such as that the bus master signal is transmitted from a Universal Serial Bus (USB) to the South Bridge 30. As shown in step S11, the control signal is transmitted from the South Bridge 30 to the CPU 10, which means the control signal is transmitted from the power management unit 37 of the South Bridge 30 to implement step S12 in order to drive the CPU 10 to enter the C2 state.

In the embodiment, the bus master signal is sent by the peripheral device 39, which is coupled to the South Bridge 30 when the CPU 10 is in the C3 state. Therefore, the control signal is transmitted directly from the South Bridge 30 to the CPU 10 without proceeding step S1 in the former embodiment. Sequentially, the confirming signal is transmitted from the South Bridge 30 to the North Bridge 20 to enable the North Bridge 20 to make sure whether the CPU 10 has entered the C2 state in step S13. After the CPU 10 is confirmed to enter the C2 state, the arbiters 25, 35 are enabled individually by the North Bridge 20 and the South Bridge 30 in step S14. Therefore, the bus master signal is transmitted from the South Bridge 30 to the CPU 10 via the North Bridge 20 and the South Bridge 30 for snooping in order to transmit data between the peripheral device 39 and the memory 15. After the bus master signal is snooped by the CPU 10 and the data has been transmitted between the peripheral device 39 and the memory 15, the arbiters 25, 35 are disabled individually by the North Bridge 20 and the South Bridge 30 in step S15. Lastly, the control signal is transmitted from the South Bridge 30 to the CPU 10 to drive the CPU 10 to return to the C3 state as shown in step S16.

In the above steps, the confirming signal is transmitted from the South Bridge 30 to the North Bridge 20 after the CPU 10 enters the C2 state by driving the North Bridge 20 and the South Bridge 30 to implement the handshake. Besides, to avoid the situation that the CPU 10 has returned to the C3 state before the bus master signal is transmitted to the CPU 10 via the North Bridge 20, the indicating signal is transmitted from the South Bridge 30 to the North Bridge 20. The indicating signal provides the North Bridge 20 with the information to know whether the bus master signal is received by the South Bride 30. If there is no the bus master signal received by the South Bridge 30, the South Bridge 30 stops issuing the indicating signal to the North Bridge 20. Meanwhile, the North Bridge 20 keeps on issuing the indicating signal to the South Bridge 30 until the bus master signal is snooped by the CPU 10 and the data has been transmitted between the peripheral device 39 and the memory 15. While the North Bridge 20 stops issuing the indicating signal, the control signal is transmitted from the South Bridge 30 to the CPU 10 and drives the CPU 10 to return to the C3 state.

Moreover, for the situation that the North Bridge 20 enters a sleeping state directly after the CPU 10 enters the C3 state, in step S11, the driving signal is also transmitted from the South Bridge 30 to the North Bridge 20 to enable the North Bridge 20 to leave the sleeping state and return to the normal operation state. Further, a reply signal is then transmitted from the North Bridge 20 to the South Bridge 30 to drive the South Bridge 30 to enable the arbiter 35 of the South Bridge 30 while driving the North Bridge 20 and the South Bridge 30 to implement the handshake and the North Bridge 20 is in the normal operation state. Either the trigger signal, which can be transmitted from the South Bridge 30 to the North Bridge 20, or the indicating signal can also be the driving signal.

Figure 6:
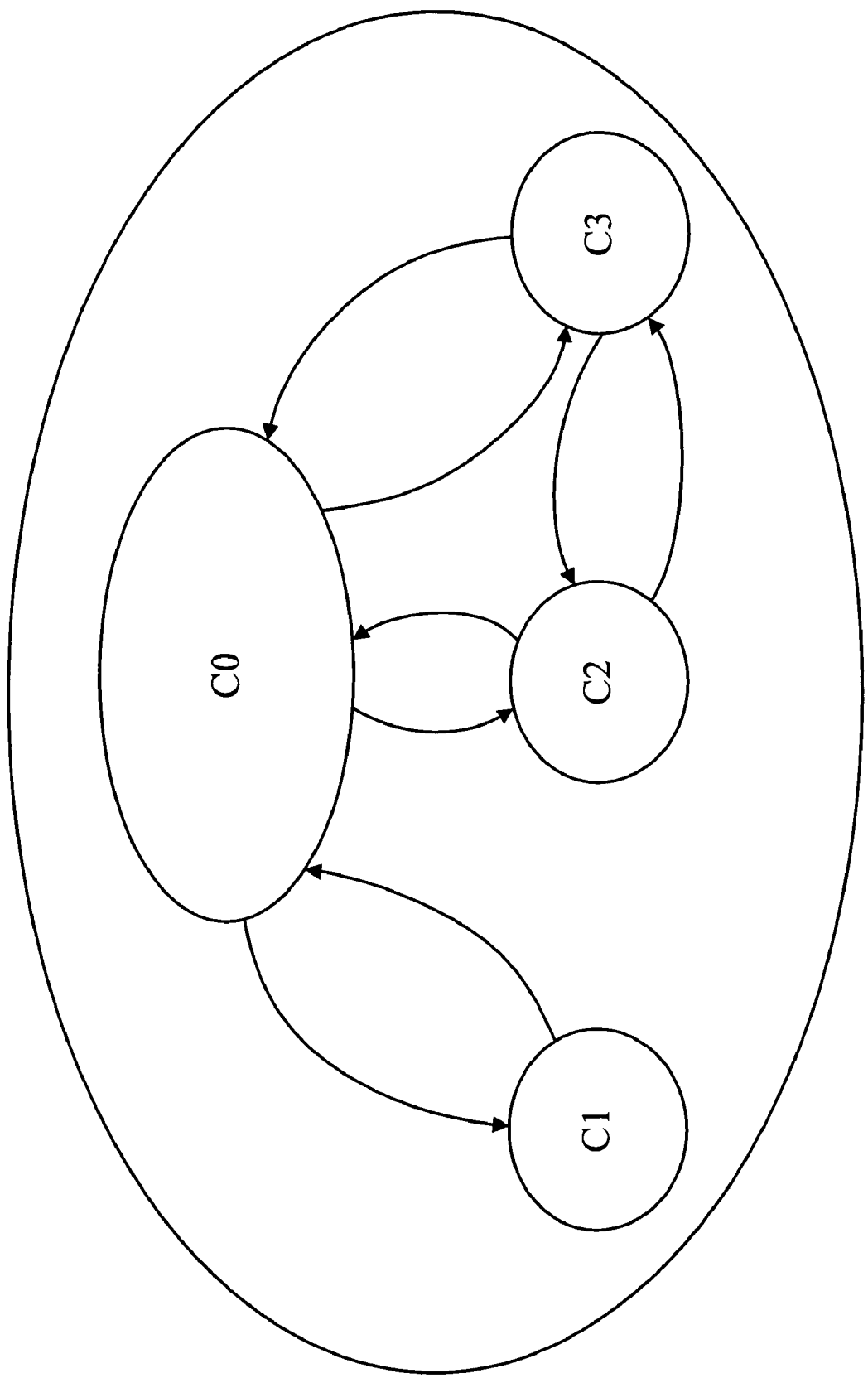
FIG. 6 is a schematic diagram illustrating the status of the central processor unit according to an embodiment of the present invention.

Referring to FIG. 6, a schematic diagram illustrates the status of the CPU according to an embodiment of the present invention. As shown in the figure, the CPU 10 can directly enter the C2 state from the C3 state and then the bus master signal is transmitted to the CPU 10 when the peripheral devices of the North Bridge 20 or the South Bridge 30 issue the bus master signal, hence the CPU 10 has the ability to snoop the bus master signal in the C2 state without entering the C0 state for achieving the goal of power savings.

As the mention above, the method for the power management of the CPU is applied to driving the CPU to enter the low power state allowing snooping from a low power state without snooping when the North Bridge or the South Bridge receives a bus master signal such that the arbiters are enabled. After the bus master signal has been snooped by the CPU and the data has been transmitted, the CPU then returns to the low power state without snooping after the arbiters are disabled so that the power savings performance of the CPU can be improved.

While the invention has been described with respect to the physical embodiments constructed in accordance therewith, it will be apparent to those skilled in the art that various modifications, variations and improvements of the present invention may be made in light of the above teachings and within the purview of the appended claims without departing from the spirit and intended scope of the invention. In addition, those areas, in which it is believed that those of ordinary skill in the art are familiar, have not been described herein in order to not unnecessarily obscure the invention described herein. Accordingly, it is to be understood that the invention is not to be limited by the specific illustrative embodiments, but only by the scope of the appended claims.

What is claimed is:

1. A method for a power management of a central processor unit, applied to when said central processor unit being in a C3 state and a bus master signal being received by a North Bridge, comprising:

issuing a driving signal from said North Bridge to a South Bridge to enable said South Bridge to send a control signal to said central processor unit to drive said central processor unit to enter a C2 state;

enabling an arbiter of said North Bridge by said North Bridge according to a confirming signal sent from said South Bridge to said North Bridge; and snooping said bus master signal by said central processor unit;

wherein said arbiter is disabled by said North Bridge and drives said central processor unit to return to said C3 state after said bus master signal is snooped and the data has been transmitted.

2. The method of claim 1, wherein a trigger signal is transmitted from said North Bridge to said South Bridge to serve as said driving signal.

3. The method of claim 2, further comprising:

driving said North Bridge to keep on issuing an indicating signal to said South Bridge and to provide an information to said South Bridge to know that there is still said bus master signal in said North Bridge until said bus master signal being snooped by said central processor unit and the data having been transmitted, then said South Bridge being enabled to send said control signal to said central processor unit to drive said central processor unit to return to said C3 state.

4. The method of claim 1, further comprising:

sending an indicating signal from said North Bridge to said South Bridge to serve as said driving signal and to indicate that said North Bridge is received said bus master signal; and stopping sending said indicating signal if said bus master signal being snooped by said central processor unit and the data having been transmitted, then said South Bridge being enabled to send said control signal to said central processor unit to drive said central processor unit to return to said C3 state.

5. The method of claim 1, wherein said control signal is transmitted from a power management unit of said South Bridge to said central processor unit.

6. The method of claim 1, further comprising:

driving said North Bridge and said South Bridge to implement a handshake, and sending said confirming signal from said South Bridge to provide an information to said North Bridge to know that said central processor unit has entered said C2 state after issuing said driving signal to said South Bridge.

7. A method for a power management of a central processor unit, applied to when said central processor unit being in a C3 state and a bus master signal being received by a South Bridge, comprising:

sending a control signal from said South Bridge to said central processor unit to drive said central processor unit to enter a C2 state;

enabling an arbiter of a North Bridge and an arbiter of said South Bridge respectively according to a confirming signal sent from said South Bridge to said North Bridge; and snooping said bus master signal by said central processor unit;

wherein said arbiters are disabled by said North Bridge and said South Bridge respectively and drives said central processor unit to return to said C3 state after said bus master signal is snooped and the data has been transmitted.

8. The method of claim 7, further comprising:
sending an indicating signal from said South Bridge to said North Bridge to indicate that said South Bridge is received said bus master signal, and stopping sending said indicating signal if no said bus master signal being received by said South Bridge;
sending said indicating signal from said North Bridge to said South Bridge while said central processor unit being in said C2 state and said bus master signal being transmitted from said South Bridge to Said North bridge, and
stopping sending said indicating signal to said South Bridge after said bus master signal being snooped by said central processor unit and the data having been transmitted, then said South Bridge being enabled to send said control signal to said central processor unit to drive said central processor unit to return to said C3 state.

9. The method of claim 7, further comprising:
transmitting a driving signal from said South Bridge to said North Bridge to enable said North Bridge to return to normal operation state when said South Bridge sending said control signal to said central processor unit.

10. The method of claim 9, wherein a trigger signal is transmitted from said South Bridge to said North Bridge to serve as said driving signal.

11. The method of claim 9, further comprising:
transmitting an indicating signal from said South Bridge to said North Bridge to serve as said driving signal and to indicate that said South Bridge is received said bus master signal until no said bus master signal in said South Bridge; and
transmitting said indicating signal from said North Bridge to said South Bridge when said central processor unit entering said C2 state and said bus master signal being transmitted from said South Bridge to said North Bridge and stopping sending said indicating signal to said South Bridge after said bus master signal being snooped by said central processor unit and the data having been transmitted, then said South Bridge being enabled to send said control signal to said central processor unit to drive said central processor unit to return to said C3 state.

12. The method of claim 7, wherein said control signal is transmitted from a power management unit of said South Bridge to said central processor unit.

13. The method of claim 7, further comprising:
driving said North Bridge and said South Bridge to implement a handshake, and then said confirming signal being sent by said South Bridge to provide an information to said North Bridge to know that said central processor unit has entered said C2 state and to enable said arbiter of said North Bridge after said central processor unit has being entered said C2 state.

14. The method of claim 13, further comprising:
sending a reply signal to said South Bridge to provide an information to said South Bridge to confirm that said North Bridge is in normal operation state and to enable said arbiter of said South Bridge.

15. A method for a power management of a central processor unit, applied to when said central processor unit being in a low power state without snooping and a bus master signal being from a peripheral device, comprising:
sending a control signal from a South Bridge to said central processor unit to drive said central processor unit to enter a lower power state allowing snooping;
enabling an arbiter of a North Bridge according to a confirming signal transmitted from said South Bridge to said North Bridge; and
snooping said bus master signal by said central processor unit;
wherein if said bus master signal is transmitted from said peripheral device to said South Bridge, an arbiter of said South bridge is enabled, said North Bridge is driven to disable said arbiter of said North Bridge and drive said central processor unit to return to said low power state without snooping, and said South Bridge is driven to disabled said arbiter of said South Bridge as said arbiter of said South Bridge is enabled after said bus master signal is snooped and the data has been transmitted.

16. The method of claim 15, further comprising:
sending a driving signal from said North Bridge to said South Bridge to drive said South Bridge to send said control signal to said central processor unit before sending said control signal to said central processor unit.

17. The method of claim 16, further comprising:
driving said North Bridge to keep on issuing an indicating signal to said South Bridge and to indicate that said North Bridge is received said bus master signal until said bus master signal being snooped by said central processor unit and the data having been transmitted, then said South Bridge being enabled to send said control signal to said central processor unit to drive said central processor unit to return to said low power state without snooping.

18. The method of claim 15, further comprising:
sending an indicating signal from said South Bridge to said North Bridge for indicating that said South Bridge is received said bus master signal, and stopping sending said indicating signal if no said bus master signal being received by said South Bridge;
sending said indicating signal from said-North Bridge to said South Bridge while said central processor unit being in said lower power state allowing snooping and said bus master signal being transmitted from said South Bridge to said North bridge; and
stopping sending said indicating signal to said South Bridge after said bus master signal being snooped by said central processor unit and the data having been transmitted, then said South Bridge being enabled to send said control signal to said central processor unit to drive said central processor unit to return to said low power state without snooping.

19. The method of claim 15, further comprising:
transmitting a driving signal from said South Bridge to said North Bridge to enable said North Bridge to return to normal operation state when said South Bridge sending said control signal to said central processor unit.

20. The method of claim 15, further comprising:
driving said North Bridge and said South Bridge to implement a handshake, and sending said confirming signal from said South Bridge to provide an information to said North Bridge to know that said central processor unit has entered said low power state allowing snooping after said central processor unit entering said low power state allowing snooping.

* * * * *